Figure 1:
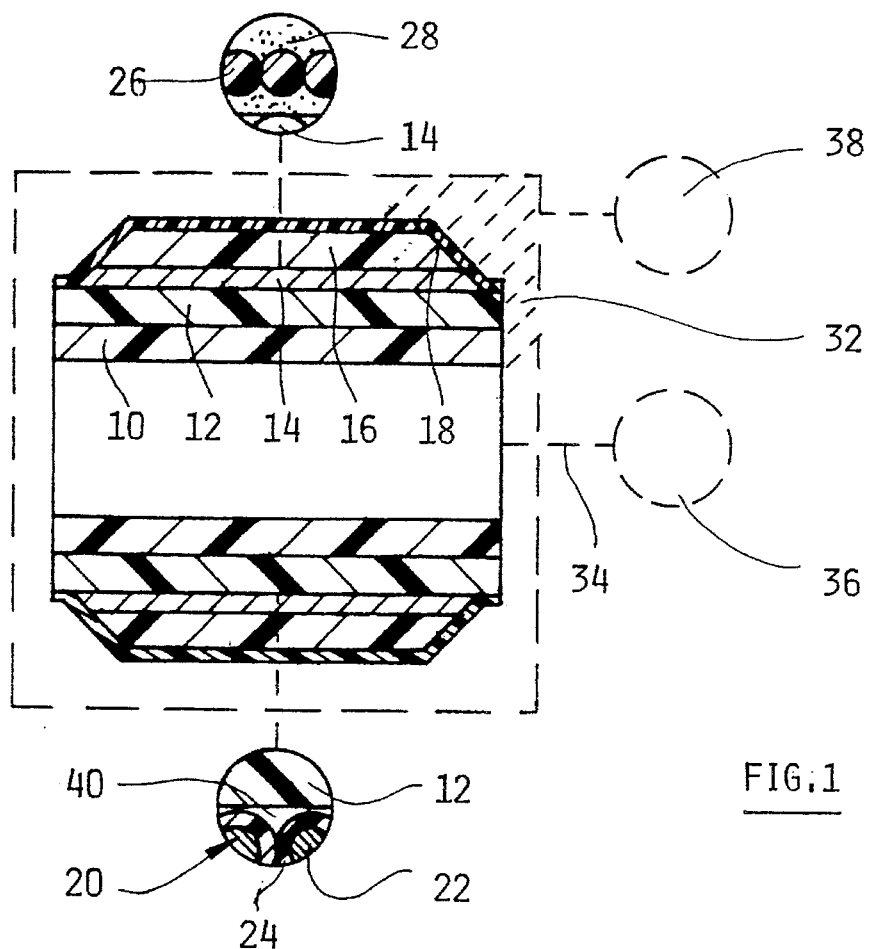

United States Patent [19]

Preu et al.

[11] Patent Number: 5,455,392
[45] Date of Patent: Oct. 3, 1995

[54] INSULATED WINDING, TOGETHER WITH PROCESS AND SEMI-FINISHED PRODUCT FOR THE PRODUCTION THEREOF

[76] Inventors: Hans Preu, Schutzenweg 3, 70771 Leinfelden-Echterdingen, Germany; Viktor Doroschenko, Karbysheva Str. 9-139, 220600 Minsk, Belorussia, U.S.S.R.

[21] Appl. No.: 104,140
[22] PCT Filed: Feb. 17, 1992
[86] PCT No.: PCT/EP92/00327
 § 371 Date: Dec. 22, 1993
 § 102(e) Date: Dec. 22, 1993
[87] PCT Pub. No.: WO92/14778
 PCT Pub. Date: Sep. 3, 1992

[30] Foreign Application Priority Data

Feb. 17, 1991 [DE] Germany .......................... 41 04 868.7

[51] Int. Cl.⁶ ..................... H01B 7/02; H01F 27/30
[52] U.S. Cl. ..................... 174/120 R; 29/592.1; 174/110 F; 174/110 PM; 336/205; 336/222
[58] Field of Search ............. 174/120 R, 120 SR, 174/110 F, 110 PM; 29/592.1; 336/205, 222; 427/116

[56] References Cited

U.S. PATENT DOCUMENTS

| | | |
|---|---|---|
| 2,929,744 | 3/1960 | Mathes et al. . |
| 3,223,553 | 12/1965 | Morey . |
| 3,308,414 | 3/1967 | Ostrander et al. ................. 336/205 |
| 3,412,354 | 11/1968 | Sattler .............................. 336/205 |
| 3,430,174 | 2/1969 | Kogo et al. ........................ 336/83 |
| 3,462,544 | 8/1969 | King .............................. 174/113 R |
| 3,466,585 | 9/1969 | Kucharski ......................... 336/148 |
| 3,676,814 | 7/1972 | Trunzo et al. .................... 336/205 |
| 4,617,324 | 10/1986 | Muenchow et al. ................. 521/96 |
| 5,140,292 | 8/1992 | Aronow ........................... 336/205 |

FOREIGN PATENT DOCUMENTS

| | | |
|---|---|---|
| 223085 | 5/1987 | European Pat. Off. . |
| 277791 | 12/1951 | Switzerland . |

*Primary Examiner*—Morris H. Nimmo
*Attorney, Agent, or Firm*—Lowe, Price, LeBlanc & Becker

[57] ABSTRACT

The invention concerns an electrical winding with a conductor layer (14) which is sealed in an insulating layer (30) of polyethylene. The polyethylene has a degree of crosslinking of at least 60% and contains an anti-oxidant. The starting material used is a not yet crosslinked polyethylene to which a foaming agent is added so that, when heated to be crosslinked, during which it also melts, the polyethylene penetrates between the individual turns (20) in the conductor layer (14). The protective insulating layer (24) round the individual turns of the winding consists of a material which is stable at the crosslinking temperature.

24 Claims, 3 Drawing Sheets

INSULATED WINDING, TOGETHER WITH PROCESS AND SEMI-FINISHED PRODUCT FOR THE PRODUCTION THEREOF

The invention relates to an insulated winding according to the precharacterising clause of claim 1, to a process and to a semi-finished product for the production thereof.

Insulated windings of various, usually annular or coil-shaped geometries have the most varied applications in transformers, magnets, converters, loudspeakers etc. For many purposes it is a requirement that the windings also withstand rapid temperature changes, high humidity and chemically aggressive media, as are, for example, contained in the contaminated air found in industrial plants.

In such known windings, the insulation is produced by impregnating the conducting layers with a resin with simultaneous application of a vacuum, optionally filling, providing a surface covering and casting in a mould. This type of production requires several drying operations at elevated temperatures. The resins, filler etc. used are harmful to health and the finished product often requires mechanical finishing to remove beads and flash. Protective measures must be taken to protect terminal lugs and the like.

If there is any departure from this per se well-tried production process, if, for example, less expensive materials are used which are more hygroscopic, or if the operations are performed in locations with higher atmospheric humidity or if the various components are not measured out exactly, the windings obtained do not fulfil high quality requirements. Moreover, there still remains with such known insulated windings exposed to extreme thermal loads the problem of stress fractures in the insulating layer on exposure to large temperature changes since the insulating layer is relatively brittle and has a coefficient of thermal expansion which is very different to that of the embedded electrical wire material.

The present invention is intended to provide an insulated winding according to the precharacterising clause of claim 1 in which the insulating layer forms a monolithic matrix reliably bonded to the conductor layers, even after major changes in temperature.

This object is achieved with a winding according to claim 1.

In the electrical winding according to the invention, the insulating layer retains a certain elasticity and can therefore follow the temperature-determined dimensional changes of the conductor layers without being destroyed, even over a large number of widely varying temperature cycles. The winding may here be produced at low cost using a relatively non-critical operating process, during which no harmful vapours are released.

Windings according to the invention are self-sealing when moderately overheated as the polyolefin just melts, but reforms a monolithic insulating matrix on subsequent cooling.

Windings according to the invention are free of cavities and cannot be penetrated by moisture.

Advantageous further developments of the invention are stated in the subordinate claims.

The further development of the invention according to claim 2 provides that the polyolefin material may also penetrate between the interstices remaining between the individual conductors in the conductor layer. A particularly large contact area between the insulating layer and conductor layers is therefore obtained.

The further development of the invention according to claim 3 is advantageous in respect of the long-term retention of the elastic properties of the insulating layer.

With the further development of the invention according to claim 5, an impermeable covering for the insulating layer is obtained which prevents the penetration of extraneous materials from the surrounding atmosphere and thus again improves the long-term stability of the winding.

In the process stated in claim 6, formation of the monolithic insulating layer around the conductor layers is performed in a manner which is particularly technically simple and is undemanding in terms of process control.

With the further development of the invention according to claim 9, application of the insulating layer material to the conductor layers may be simply achieved as the insulating layer material is present as a simply handled elongated or flat article. These articles may readily be inserted by machine into the winding as it is being produced.

The further development of the invention according to claim 10 favours the penetration of the insulating layer material into the interstices between the individual conductors.

The further development of the process according to claim 12 here ensures that foaming proceeds inwardly onto the conductors.

The further development of the process according to claim 13 also provides good filling of the interstices between the individual conductors of the winding.

The semi-finished products stated in claim 14 are factory made and may readily also be used for short production runs by the person skilled in the art: tapes and filaments may be wound between the layers of the winding, pieces of film may also be laid over printed circuits instead of an insulating lacquer. In each case, an intimate bond with the substrate to be insulated is produced in situ by means of subsequent heat treatment, the conditions of which are not critical. The semi-finished products are also suitable for in situ production of seals.

A semi-finished product according to claim 15 is distinguished by particularly good ease of use. Both remnants of the semi-finished product and windings made from it may be disposed of in an environmentally friendly manner.

The semi-finished product stated in claim 16 may be particularly readily produced by extrusion.

A semi-finished product according to claim 17 is distinguished by particularly high dielectric strength.

With a semi-finished product according to claim 18, well insulated windings may be produced by simply winding a single wire.

A semi-finished product according to claim 19 may here be wound even into small diameter coils without major energy consumption.

The further developments of the invention according to claims 20 to 24 are again advantageous in respect of long-term chemical stability or foaming of the polyolefin material on heat treatment.

The invention is explained in greater detail below with practical examples referring to the drawing. In the drawing:

FIG. 1: shows an axial section through a winding preform together with an heat treatment device indicated with a dashed line.

Figure 2:
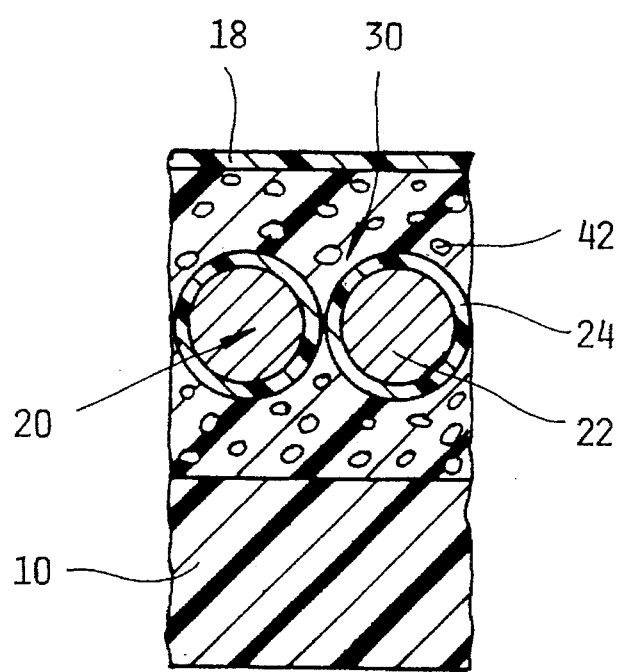

FIG. 2: shows an enlarged partial section through the area surrounding the conductor layer in a finished winding produced from the preform according to FIG. 1.

Figure 3:
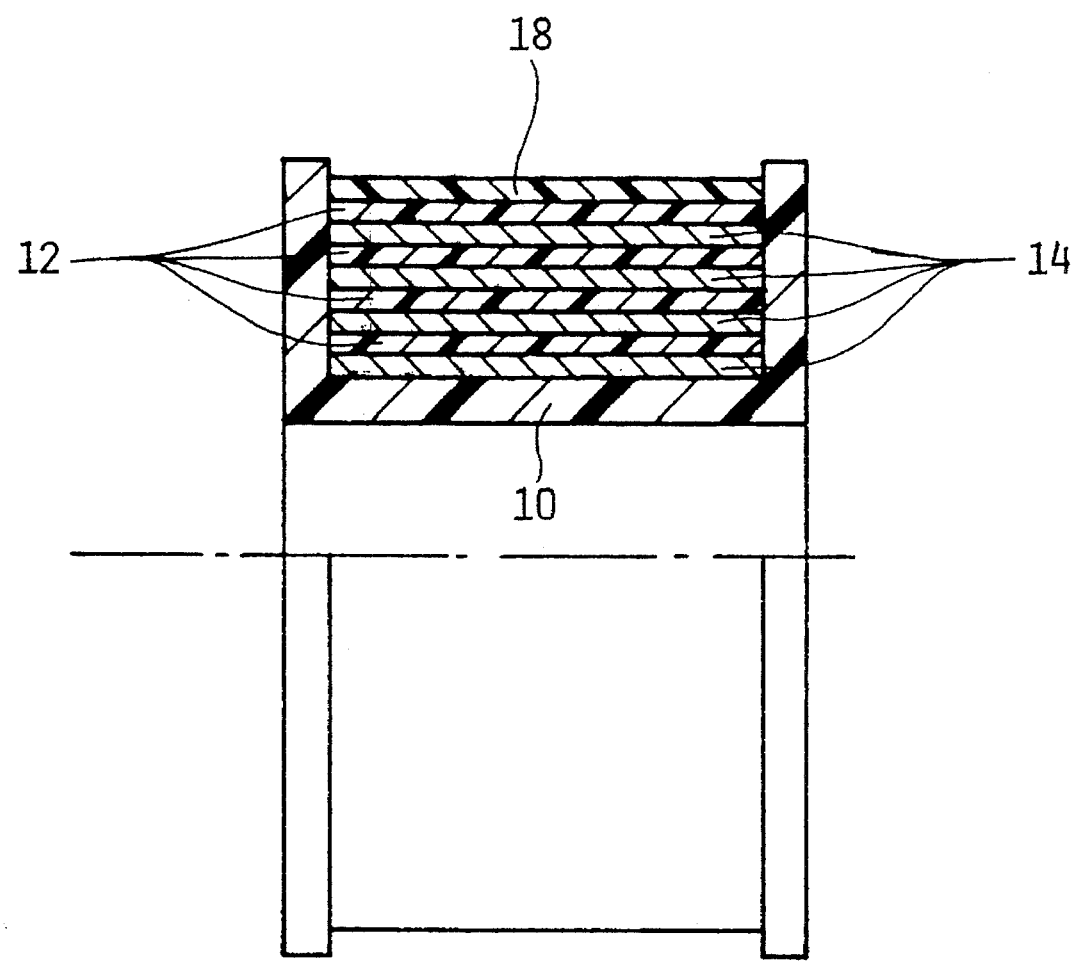
Figure 4:
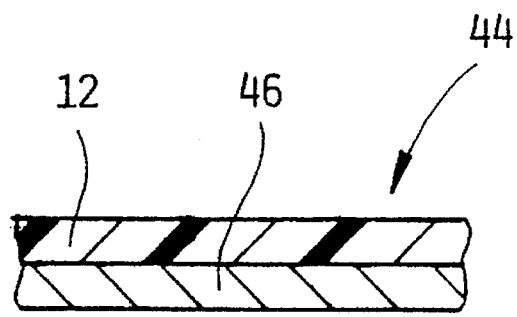
Figure 5:
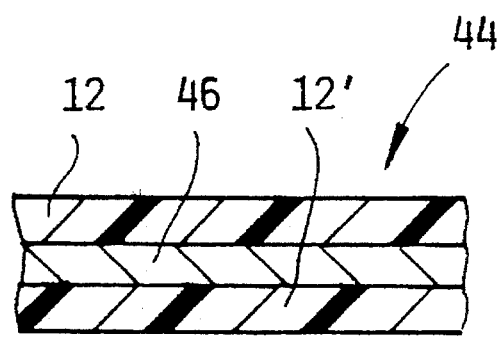
Figure 6:
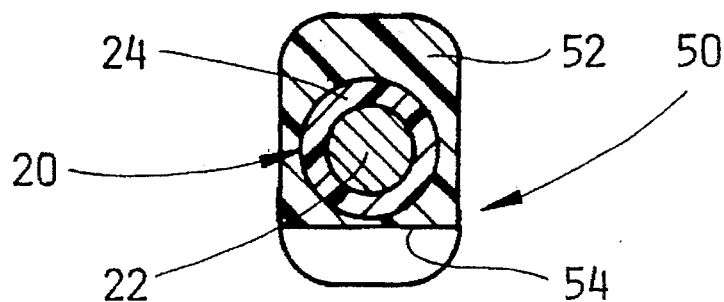
Figure 7:
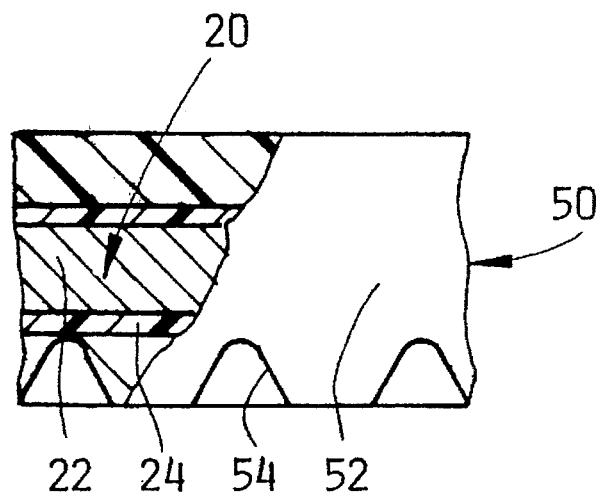

FIG. 3: shows an axial section through a multi-layer coil;

FIG. 4 shows a section through a composite insulating semi-finished product;

FIG. 5: shows a section through a modified composite insulating semi-finished product;

FIG. 6 shows a transverse section through an insulated conductor covered with an injected insulating semi-finished product; and FIG. 7: shows a lateral view of the material according to FIG. 6 with a partial axial section.

In FIG. 1, a winding core made of plastic is numbered 10. Onto this is wound a tape 12, which consists of as yet uncrosslinked or only slightly crosslinked polyethylene material. Over the tape 12 there is a conductor layer 14, which is in turn covered by a further tape 16 made from uncrosslinked or only slightly crosslinked polyethylene material. This arrangement of layers is covered on the outside by a tape 18 made from polyethylene terephthalate.

The conductor layer 14 consists of individual electrical conductors 20 which are wound in a single abutting layer and each of which comprises an electrically conductive metal core 22 enclosed in an enamel-like electrically insulating protective layer 24. The tapes 12 and 16 each consist of a layer of filaments 26 consisting of uncrosslinked polyethylene. This layer of filaments is embedded in a layer 28, which consists of small uncrosslinked polyethylene particles. This polyethylene tape material may, for example, be produced by rolling the powdered unpolymerised polyethylene material onto the filaments 26. Alternatively, the layer 28 may also be applied around the filaments 26 by extrusion. What is important is that the material of the finished tapes 12 and 16 is not yet crosslinked or is only slightly so (up to 15%).

The material of the protective layer 24 is resistant to those temperatures at which the polyethylene material is crosslinkable (typically of the order of 160° C.), both in itself and in terms of its adhesion to the metallic cores 22.

The polyethylene material contains both a crosslinking agent and an antioxidant together with a foaming agent at least in the layer 28, preferably in the filaments 26 as well.

In order to obtain from the polyethylene material a monolithic insulating layer which positively and solidly encloses the conductor layer 14, as is shown in FIG. 2 at 30, the winding preform shown in FIG. 1 is placed in a two part mould 32. The internal surface of this mould is complementary to the desired outer surface of the winding. The mould cavity is connected to a vacuum source 36 via a line 34. The mould 32 is also connected to a heating device 38.

If the mould 32 is heated to a temperature of 160° C. and the winding preform is held at this temperature for a period of two hours, the polyethylene material melts, foams and crosslinks. In this manner, the polyethylene material penetrates between the individual conductors 20 and completely fills the interstices 40 which are initially present there (c.f. FIG. 1). At the same time, the polyethylene material crosslinks and thus forms a solid but still elastic monolithic matrix in which the conductors 20 are now embedded. Since the protective layer 24 is resistant to the temperatures used for melting, foaming and crosslinking the polyethylene material, the protective layers 24 of the individual conductors 20 remain unchanged.

In FIG. 2, the pores obtained on foaming the polyethylene material are numbered 42. Their size and number may be predetermined by the quantity of foaming agent added to the polyethylene material and by the pressure set in the mould 32 during heat treatment.

After heat treatment of the winding preform, the tape 18 is also firmly bonded to the insulating layer 30 by being fused to the polyethylene material.

FIG. 3 shows a winding preform for a multi-layer winding, wherein parts of the preform are numbered analogously to FIG. 1 and FIG. 2.

The polyethylene material used in the production of the tapes 12 and 16 comprises, in addition to substantially uncrosslinked polyethylene, approximately 0.5 to approximately 2 wt. % of crosslinking and foaming agent and approximately 0.3 to 0.5 wt. % of antioxidant.

Organic peroxides may in particular be considered as crosslinking and foaming agent and amine compounds in particular as antioxidants.

Examples of such peroxides are: bis-($\alpha,\alpha$-dimethylbenzene) peroxide (dicumyl peroxide); 1,3-di-(tert-butyl-peroxide isopropyl)benzene; 2,4-dichlorobenzene peroxide; complexes of organic peroxides with carbamide, for example bis-($\alpha,\alpha$-adimethylbenzene) peroxide with carbamide in a ratio of approximately 1:3 to 1:10, preferably approximately 1:5; mixtures of tert-butyl monoperoxides of meta-paradiisopropylbenzenes and 1,1,3-trimethylinphane (Monoperoxin).

Antioxidants of the amine type which may, for example, be used are: N,N'-di-(naphthyl-2)-phenylenediamine-(1,4) (Diaphen HH) or N-nitroso-diphenylamine (Diaphenam H). Further antioxidants are: 4,4'-thio-bis(6-tert-butyl-3-methylphenol) (Phenosan F), 2-(3,5-di-tert-butyl-4-hydroxyphenyl-propionylhydrazino)-5-(3,5-di-tert-butyl-4-hydroxyphenylethyl)-2,3-dihydro-1,2,3,4-oxaphosphadiazole (Santonox K).

On heat treatment, a degree of crosslinking of the polyethylene of between 60 and 95% is achieved. This may be simply macroscopically measured by means of the mechanical properties of the polyethylene, for example by means of the so-called "puncture resistance" of test pieces. At a temperature of 200° C., there is the following relationship between puncture resistance and degree of crosslinking:

| Puncture resistance (%) | Degree of crosslinking (%) |
| --- | --- |
| 30–40 | 50 |
| 60–65 | 60 |
| 70–80 | 70 |

Various examples of the composition of the polyethylene material are given below:

EXAMPLE 1.0 wt. % of bis-,($\alpha,\alpha$-dimethylbenzene) peroxide as crosslinking and blowing or foaming agent and 0.4 wt. % of N,N'-di-(naphthyl-2)-phenylenediamine-(1,4) are added to high pressure polyethylene using the diffusion process. The polyethylene compound so obtained is processed into a film at a temperature of 105°–130° C. No appreciable crosslinking of the polyethylene occurs within this temperature range. This film was laid around a winding core and a conductor layer was wound on top of the film. A polyethylene terephthalate film was then wound on top of the conductor layer. Under atmospheric pressure, the layered structure so obtained was held at a temperature of 160°±5° C. for three hours. After this, the degree of crosslinking of the polyethylene insulating layer is at least 65%.

During heat treatment, the polyethylene compound foams and fills the interstices in the layered structure. A fine-pored insulating layer of crosslinked polyethylene is so obtained. During heat treatment, strong adhesive bonds are produced between the insulating layer and conductor layer, the insulating layer and winding core and between the insulating layer and the external protective layer. The insulating layer and the conductor layer embedded therein thus form a resistant monolithic unit capable of withstanding even major variations in temperature.

The degree of crosslinking and elastic properties of the finished insulating layer may be influenced by the type and quantity of crosslinking agent and the selected oxidation inhibitor, as may be seen from the tables below:

TABLE 1

Degree of crosslinking and relative elongation of
a polyethylene insulating layer with 0.4 wt. %
Diaphen and 0.3–3 wt. % dicumyl peroxide.
(Degree of crosslinking according to gel fraction
content; relative elongation after two hours'
loading at 150 ± 5° C.; figures in %)

| Peroxide (wt. %) | 0.3 | 0.4 | 0.5 | 1.0 | 1.5 | 2.0 | 2.5 | 3.0 |
|---|---|---|---|---|---|---|---|---|
| Degree of crosslinking (%) | 47 | 53 | 61 | 63 | 65 | 66 | 66 | 67 |
| Relative elongation (%) | — | 71 | 91 | 93 | 92 | 90 | 84 | 72 |

TABLE 2

Degree of crosslinking and relative elongation
for a polyethylene insulating layer with 1.0 wt. %
dicumyl peroxide and 0.1–0.7 wt. % Diaphen HH
(heat treatment over two hours at 160° C.; degree
of crosslinking according to gel fraction
content; relative elongation after two hours'
loading at 150 ± 5° C.; figures in %)

| Diaphen HH (wt. %) | 0.1 | 0.2 | 0.3 | 0.4 | 0.5 | 0.6 | 0.7 |
|---|---|---|---|---|---|---|---|
| Degree of cross-linking (%) | 68 | 66 | 65 | 63 | 61 | 58 | 53 |
| Relative elongation (%) | 77 | 86 | 91 | 93 | 94 | 94 | 93 |

TABLE 3

Degree of crosslinking for a polyethylene
insulating layer with 1.5 wt. % peroxide for
various crosslinking agents and various
temperatures (in %, after 1 hour's heat treatment
at 160° C.; figures in %)

| Crosslinking agent | Temperature (°C.) | | | | | |
|---|---|---|---|---|---|---|
| | 130 | 140 | 150 | 160 | 170 | 180 |
| bis-(α,α-dimethylbenzene) peroxide (dicumyl peroxide) | 0 | 15 | 52 | 62 | 65 | 68 |
| 1,3-di-(tert-butyl-peroxide-isopropyl)benzene | 0 | 0 | 17 | 55 | 60 | 65 |
| Complex of bis-(α,α-dimethylbenzene) peroxide (dicumyl peroxide) with carbamide | 0 | 12 | 46 | 59 | 74 | 79 |

In order to obtain windings which may be subjected to high loads, it is important that the relative elongation of the insulating layer after the crosslinking heat treatment and additional heat ageing at a temperature of 150°±5° C. over two hours is at least 90%.

EXAMPLE 2

2,4-dichlorobenzene peroxide and 0.5 wt. % of N,N'-di-(naphthyl-2)-phenylenediamine were incorporated by the diffusion process into high pressure polyethylene with the properties already stated in example 1. Otherwise, the procedure was as per example 1. The degree of crosslinking of the finished insulating layer is 62% for this example. The insulating layer is distinguished by a very fine pored structure.

EXAMPLE 3

This example corresponds to example 1 with the proviso that N-nitroso-diphenylamine (Diaphenam H) is used as antioxidant. A degree of crosslinking of the insulating layer of at least 65% is obtained. The Diaphenam H improves the processability of the film produced from the polyethylene compound and ensures even greater adhesion between the insulating layer and the protective layer of the winding wire. Further improved resistance to damage to the crosslinked polyethylene caused by thermal oxidation is also obtained.

In the above-described manner, windings were produced by way of example for transformers with a power of up to 1 kW for an operating frequency of 50 kHz. These windings are suitable for use under difficult operating conditions: temperature of use from −60° C. to 130° C.; relative atmospheric humidity of 98% at a temperature of 40° C. over 21 days; vacuum up to 53600 Pa (400 Torr); mechanical loading: multiple impacts up to 400 m/s$^2$, individual impacts up to 1500 m/s$^2$ linear acceleration up to 100 m/s$^2$, vibrations from 1 to 500 Hz at accelerations up to 100 m/s$^2$. Their insulating resistance in normal surroundings is at least $10^9$ Ohm, at 120° C. at least $10^8$ Ohm and in moist surroundings $10^7$ to $10^9$ Ohm.

It was possible to produce these transformer windings without auxiliary materials and complicated tools. The production process is reliable and safe. Using the process, it is possible to place practically 100% of the insulating layer material used in the solid phase in the winding, such that it is possible to work practically without wastage and in an environmentally friendly manner.

The particularly good properties of the insulated windings produced as described above are presumably attributable to the degree of crystallinity and consequently also the proportion of the amorphous phase being reduced on crosslinking of the polyethylene. In this way internal stresses are reduced and relieved both during heat treatment of the winding preform and subsequently during operation of the winding. The resistance of the winding to delamination and cracking is increased compared to conventional windings. Since the crosslinked polyethylene adheres very well to the protective layer of the electric conductors, not only are the individual turns very solidly fixed, but the conductor wires are also hermetically sealed. The insulating layer is here more elastic than with resin impregnated windings, which increases service life. Since the insulating layer material melts on heat treatment, any stresses still present in the protective layer of the conductors and in the conductor cores may be relieved, since the conductor, which to a certain extent undergoes elastic elongation during winding, may shorten.

It is achieved by means of the production process described above that the interstices between the individual conductors are completely filled when the polyethylene material foams. When foaming is performed in a mould, the porous insulating layer so obtained also simultaneously forms defined end surfaces of the winding and a defined outer surface requiring no further finishing.

Instead of the semi-finished product used for the production of the winding described above which was a polyethylene film or a tape produced from such a film, it is also possible to use a modified semi-finished product 44 as is shown in FIG. 4. In this semi-finished product, an uncrosslinked or only slightly crosslinked polyethylene layer 12 is laminated onto an insulating paper 46.

A further modified semi-finished product 48 according to FIG. 5 consists of a central insulating paper 44 laminated on both sides with polyethylene layers 12, 12'.

The semi-finished products 44 and 48 may be used in a similar manner to the tapes 12 and 16 described above.

Windings which are not too densely wound may be produced simply by winding a semi-finished product 50 according to FIGS. 6 and 7. The conductor 20 is injected into a sheath 52 which consists of uncrosslinked or only slightly crosslinked polyethylene material. The sheath is of a rectangular or oval cross-section in order to allow the conductors 20 to be wound closely to each other. Bending into the individual turns may be facilitated by notches 54 which are located at least on the future internal side of the winding. After winding a coil from the semi-finished product 50, the coil preform is simply subjected to heat treatment, wherein the sheath melts, foams and crosslinks, so enclosing the conductors 20 with monolithic insulation.

Although the invention was described above preferably in connection with insulated windings in which the electrical conductors had a protective coating around the core, it will be appreciated that the invention may also be used to insulate bare conductors, for example to insulate stamped conductors or printed conductor tracks.

We claim:

1. Electrical winding with at least one conductor layer (14) made from wire material (22) coated with an insulating protective layer (24) and with an insulating layer (30) accommodating the conductor layers (14), characterised in that the insulating layer (30) is composed of a polyolefin material, in particular polyethylene material, with a degree of crosslinking of at least 60%, which material is crosslinked in situ and fused with the conductor layer (14).

2. Winding according to claim 1, characterised in that the polyolefin material is foamed (42).

3. Winding according to claim 1 or characterised in that the polyolefin material contains approximately 0.3 to approximately 0.5 wt. % of an antioxidant.

4. Winding according to claim 3, characterised in that the antioxidant comprises an amine compound or a carbamide compound, which is in particular selected from the following group: N-nitroso-diphenylamine; N,N'-di-(naphthyl-2)-phenylenediamine-(1,4); complexes of an organic peroxide with carbamide; or comes from the following group: 4,4'-thio-bis(6-tert-butyl-3-methylphenol) (Phenosan F); 2-(3,5-di-tert-butyl-4-hydroxyphenyl-propionylhydrazino)- 5-(3,5-di-tert-butyl- 4-hydroxyphenylethyl)-2,3-dihydro-1,2,3,4-oxaphosphadiazole (Santonox K).

5. Winding according to claims 1, characterised in that there is an outer layer (18) over the insulating layer (30), the softening point of which outer layer is at a distinctly higher temperature than the softening point of the polyolefin material, e.g. made from polyethylene terephthalate.

6. Process for producing a winding according to claim 1, in which an electrically conductive core (22) is coated with an electrically insulating protective layer (24) and at least one conductor layer (14) is produced from the insulated conductor (20) so obtained, wherein polyolefin-based insulating layer material is added to the conductor layer and the arrangement so obtained is subjected to heat treatment, characterised in that the core (22) is coated with a protective layer (24) such that it has higher heat resistance than the polyolefin material; in that a polyolefin material is used which is uncrosslinked or only slightly crosslinked up to a maximum of 15%; and in that the heat treatment proceeds at a temperature which is below the heat resistance limit of the conductor protective layer (24), and for a period of time such that the degree of crosslinking of the polyolefin is at least 60%.

7. Process according to claim 6, characterised in that the heat treatment is terminated at the latest when the degree of crosslinking of the polyolefin is 95%.

8. Process according to claim 6, characterised in that the uncrosslinked polyolefin material is shaped by rolling or extrusion into a filament, tape or film and the filament, tape or film is brought into contact with the conductor layer (14).

9. Process according to claims 1, characterised in that a foaming agent is added to the uncrosslinked polyolefin compound.

10. Process according to claim 9, characterised in that the foaming agent is a peroxide which decomposes during the heat treatment and is contained in an amount of approximately 0.5 to approximately 2 wt. % in the uncrosslinked polyolefin compound.

11. Process according to claim 10, characterised in that the organic peroxide compound is selected from the following group: bis-($\alpha,\alpha$-dimethylbenzene) peroxide; 1,3-di-(tert-butyl-peroxide-isopropyl)benzene; 2,4-dichlorobenzene peroxide; complex of bis-($\alpha,\alpha$-dimethylbenzene) peroxide with carbamide in a ratio of approximately 1:3 to approximately 1:10, preferably approximately 1:5; mixtures of tert-butyl monoperoxides of meta-para-diisopropylbenzenes and 1,1,3-trimethylinphane (Monoperoxin).

12. Process according to claim 9, characterised in that at least part of the heat treatment is performed in a mould, which positively encloses the winding preform constituted by the conductor layers and insulating layer material and optionally a winding core.

13. Process according to claim 7, characterised in that at least part of the heat treatment proceeds with the simultaneous application of a vacuum.

14. Semi-finished product in the form of a film, tape or filament for the performance of the process according to claim 6, characterised in that it consists of polyolefin material, preferably polyethylene material, which is uncrosslinked or only slightly crosslinked up to a maximum of 15%.

15. Semi-finished product according to claim 14, characterised in that it consists of high pressure polyethylene.

16. Semi-finished product according to claim 14, characterised in that it consists of a copolymer of ethylene with vinyl acetate.

17. Semi-finished product according to claim 14, characterised in that the polyolefin material (12) is bonded with an insulating paper (46).

18. Semi-finished product according to claim 14, characterised in that the polyolefin material is a sheath (52), preferably having an oval or rectangular cross-section, injected onto an insulated conductor (20).

19. Semi-finished product according to claim 18, characterised in that the sheath (52) is provided with notches (54) along at least one boundary surface.

20. Semi-finished product according to claim 14, characterised in that a foaming agent is added to the polyolefin compound.

21. Semi-finished product according to claim 20, characterised in that the foaming agent is a peroxide which decomposes during the heat treatment and is contained in an amount of approximately 0.5 to approximately 2 wt. % in the uncrosslinked polyolefin compound.

22. Semi-finished product according to claim 21, characterised in that the organic peroxide compound is selected from the following group: bis- (α,α- dimethylbenzene) peroxide; 1,3-di- ( tert-butyl-peroxide-isopropyl)benzene; 2,4-dichlorobenzene peroxide; complex of bis-(α,α-dimethylbenzene) peroxide with carbamide in a ratio of approximately 1:3 to approximately 1:10, preferably approximately 1:5; mixtures of tert-butyl monoperoxides of meta-para-diisopropylbenzenes and 1,1,3-trimethylinphane (Monoperoxin).

23. Semi-finished product according to claim 14, characterised in that the polyolefin material contains approximately 0.3 to approximately 0.5 wt. % of an antioxidant.

24. Semi-finished product according to claim 23, characterised in that the antioxidant comprises an amine compound or a carbamide compound, which is in particular selected from the following group: N-nitroso-diphenylamine; N,N'-di-(naphthyl-2)-phenylenediamine-(1,4); complexes of an organic peroxide with carbamide; or comes from the following group: 4,4'-thio-bis(6-tert-butyl-3-methylphenol) (Phenosan F); 2-(3,5-di-tert-butyl-4-hydroxyphenyl-propionylhydrazino)-5 -(3,5-di-tert-butyl-4-hydroxyphenylethyl)-2,3-dihydro-1,2,3,4-oxaphosphadiazole (Santonox K).

* * * * *